(12) United States Patent
Cornille et al.

(10) Patent No.: US 9,908,122 B2
(45) Date of Patent: Mar. 6, 2018

(54) WASTE FLUID HOLDING TANK DRAIN SYSTEM AND METHOD

(71) Applicant: Thetford Corporation, Ann Arbor, MI (US)

(72) Inventors: Thomas Cornille, Farmington, MI (US); Timothy Schultz, Dexter, MI (US)

(73) Assignee: THETFORD CORPORATION, Ann Arbor, MI (US)

( * ) Notice: Subject to any disclaimer, the term of this patent is extended or adjusted under 35 U.S.C. 154(b) by 7 days.

(21) Appl. No.: 14/805,535

(22) Filed: Jul. 22, 2015

(65) Prior Publication Data

US 2016/0023217 A1 Jan. 28, 2016

Related U.S. Application Data

(60) Provisional application No. 62/028,503, filed on Jul. 24, 2014.

(51) Int. Cl.
*B02C 18/00* (2006.01)
*E03B 1/04* (2006.01)
(Continued)

(52) U.S. Cl.
CPC .......... *B02C 18/0092* (2013.01); *B60R 15/00* (2013.01); *E03B 1/041* (2013.01);
(Continued)

(58) Field of Classification Search
CPC ......... Y10T 137/4857; Y10T 137/4841; Y10T 137/4807; Y10T 137/479;
(Continued)

(56) References Cited

U.S. PATENT DOCUMENTS 4,324,007 A 4/1982 Morris
5,056,544 A * 10/1991 Stevens .................. B60R 15/00
134/103.2
(Continued)

FOREIGN PATENT DOCUMENTS

EP 2168817 A2 3/2010

OTHER PUBLICATIONS

Extended European Search Report regarding Application No. 15178079.8, dated Dec. 10, 2015.

*Primary Examiner* — Atif Chaudry
(74) *Attorney, Agent, or Firm* — Stephen T. Olson; Harness, Dickey & Pierce, P.L.C.

(57) ABSTRACT

A waste fluid containment and draining system may have a black waste water holding structure for holding black waste water and a grey waste water holding structure for holding grey waste water. First and second valves may be included for enabling selective emptying of the two holding structures. A macerator pump may be used which has an input in flow communication with both of the first and second valves. A discharge conduit may be in flow communication with an output of the macerator pump. A control subsystem may be in communication with the first and second valves and the macerator pump for controlling the first and second valves, together with the macerator pump, to enable selective pumping out of the holding structures by the macerator pump through the discharge conduit.

18 Claims, 4 Drawing Sheets

(51) Int. Cl.
*B60R 15/00* (2006.01)
*F16K 31/22* (2006.01)
*C02F 103/00* (2006.01)

(52) U.S. Cl.
CPC .............. *E03B 1/042* (2013.01); *E03B 1/044* (2013.01); *F16K 31/22* (2013.01); *C02F 2103/002* (2013.01); *Y10T 137/479* (2015.04); *Y10T 137/4807* (2015.04); *Y10T 137/4841* (2015.04); *Y10T 137/4857* (2015.04); *Y10T 137/86196* (2015.04); *Y10T 137/86228* (2015.04)

(58) Field of Classification Search
CPC ..... Y10T 137/86196; Y10T 137/86228; Y10T 137/6855; B60R 15/00; E03B 2001/045; E03B 2001/042; E03B 2001/041; E03B 2001/044
See application file for complete search history.

(56) References Cited

U.S. PATENT DOCUMENTS

| | | |
|---|---|---|
| 5,589,823 A | 12/1996 | Lange |
| 6,352,088 B1 * | 3/2002 | Stegall .................... B60R 15/00 137/899 |
| RE42,688 E | 9/2011 | Stegall |
| 8,656,963 B2 | 2/2014 | Stegall |
| 8,767,379 B2 | 7/2014 | Whitaker |
| 8,810,419 B2 | 8/2014 | Gado et al. |
| 8,924,167 B2 | 12/2014 | Decker |
| 8,931,510 B2 | 1/2015 | Gaertner et al. |
| 9,421,566 B2 | 8/2016 | Harris et al. |
| 9,464,987 B2 | 10/2016 | Gillespie |
| 2002/0189673 A1 | 12/2002 | Schoellhorn et al. |
| 2008/0023090 A1 | 1/2008 | Stegall |
| 2012/0110087 A1 * | 5/2012 | Culver ................ G06F 17/5004 709/205 |
| 2014/0041110 A1 * | 2/2014 | Dannenberg ........... B64D 11/02 4/342 |
| 2014/0182712 A1 * | 7/2014 | Penner .................... E03F 1/008 137/351 |
| 2015/0100169 A1 | 4/2015 | McKinney |
| 2015/0235545 A1 | 8/2015 | Schoenheit et al. |
| 2015/0283484 A1 * | 10/2015 | Vachon ................ B01D 33/073 210/784 |
| 2016/0153950 A1 | 6/2016 | Crisp et al. |
| 2016/0179065 A1 | 6/2016 | Shahabdeen |

\* cited by examiner

WASTE FLUID HOLDING TANK DRAIN SYSTEM AND METHOD

CROSS-REFERENCE TO RELATED APPLICATIONS

This application claims priority to U.S. Provisional Patent Application No. 62/028,503 filed 24 Jul. 2014, which application is herein expressly incorporated by reference.

FIELD

The present disclosure relates to holding and drain systems and methods for waste fluids, and particularly to a waste fluid holding and drain system and method that is well adapted for use with a recreational vehicle.

BACKGROUND

The statements in this section merely provide background information related to the present disclosure and may not constitute prior art.

In the recreational vehicle industry it is common to outfit a recreation vehicle ("RV") with at least one waste holding tank. More commonly, RVs are outfitted with two such independent tanks: a "black water" tank for holding semi solid waste and a grey water tank for holding grey water. Emptying the two tanks has traditionally not been particularly easy and convenient. Some waste containing/draining systems rely on gravity and the hookup of a drain hose for emptying the contents of the tanks. This can limit draining the waste tanks up terrain into an elevated sewer dump station. It also does not allow for draining the waste tanks of the RV into an indoor toilet, such as when the user returns to his/her home with the RV and wishes to empty the waste tanks, via a suitably long drain hose, into an indoor bathroom toilet.

More recent waste draining system, such as the Sani-Con® holding tank emptying system, have proven to be extremely popular for simplifying the task of draining the waste tanks on an RV. The Sani-Con® holding tank is available from the assignee of the present disclosure and is a waste emptying system that employs a macerator pump that may be coupled to a drain port on each of the black water and grey water tanks of an RV. A long, flexible and stretchable, heavy duty one inch diameter drain hose is coupled to the macerator pump. The macerator pump grinds and liquefies black waste water and pumps it through the drain hose. The drain hose has a threaded nozzle at its end which is designed to fit securely to a variety of pump station inlets. The Sani-Con® holding tank emptying system eliminates the need for gravity in draining the waste tanks as well as associated hose supports and other components that are often needed with a gravity-based drain system. The Sani-Con® system has dramatically simplified the ease and convenience with which waste tanks may be emptied on an RV and enabled the emptying of waste tanks directly into up terrain sewer dump station or into indoor toilets.

In spite of the significant advances provided by the Sani-Con® holding tank emptying system, there is a continuing desire to even further enhance the ease and convenience in emptying waste holding tanks used on RVs. In general, the less handling of hoses, connecting fittings, etc., the easier and more convenient the emptying of waste tanks on an RV will be for the user.

SUMMARY

In one aspect the present disclosure relates to a waste fluid containment and draining system. The system may comprise a black waste water holding structure for holding black waste water and a grey waste water holding structure for holding grey waste water. A first valve may be included which is associated with the black waste water holding structure for enabling emptying of the black waste water when the first valve is opened. A second valve may be included which is associated with the grey waste water holding structure enabling emptying of the grey waste water when the second valve is opened. A macerator pump may be used which has an input in flow communication with both of the first and second valves. A discharge conduit may be in flow communication with an output of the macerator pump. A control subsystem may be in communication with the first and second valves and the macerator pump for controlling the first and second valves, together with the macerator pump, to enable selective draining of the holding structures, by the macerator pump, through the discharge conduit.

In another aspect the present disclosure relates to a waste fluid containment and draining system. The system may comprise a black waste water holding structure for holding black waste water and a grey waste water holding structure for holding grey waste water. A first liquid level sensing device may be included for sensing a level of black waste water contained in the black waste water holding structure, and generating a first electrical signal indicative of the sensed level of the black waste water. A second liquid level sensing device may be used for sensing a level of grey waste water contained in the grey waste water holding structure, and generating a second electrical signal indicative of the sensed level of the grey waste water. A first electronically actuated valve may be used which is associated with the black waste water holding structure to enable emptying of the black waste water when the first valve is opened. A second electronically actuated valve may also be used which is associated with the grey waste water holding structure to enable emptying of the grey waste water when the second valve is opened. A macerator pump may be used which has an input in flow communication with both of the first and second electronically actuated valves. A discharge conduit may be placed in flow communication with an output of the macerator pump. A control subsystem may be placed in communication with the first and second electronically actuated valves, the first and second level sensing devices, and the macerator pump. The control system may be configured to control the first and second electronically actuated valves, together with the macerator pump, to enable operation of the macerator pump and selective draining of the waste water holding structures through the discharge conduit.

In still another aspect the present disclosure relates to a method for containing and emptying waste fluids collected from one or more toilets on a vehicle. The method may comprise using a black waste water holding structure to hold black waste water. A grey waste water holding structure may be used to hold grey waste water. A plurality of valves associated with the black and grey waste water holding structures may be used to enable emptying of the black and grey waste water holding structures when the valves are selectively opened. A macerator pump may be used which has an input in flow communication with both of the first and second valves to pump out the black waste water and grey waste water holding structures. A discharge conduit may be placed in flow communication with an output of the macerator pump to drain the black waste water and the grey waste water to a remote waste water receiving facility. A control subsystem may be placed in communication with the first and second valves and the macerator pump to control the first and second valves, together with the macerator pump, to enable selective operation of the macerator pump and draining of the holding structures through the discharge conduit.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
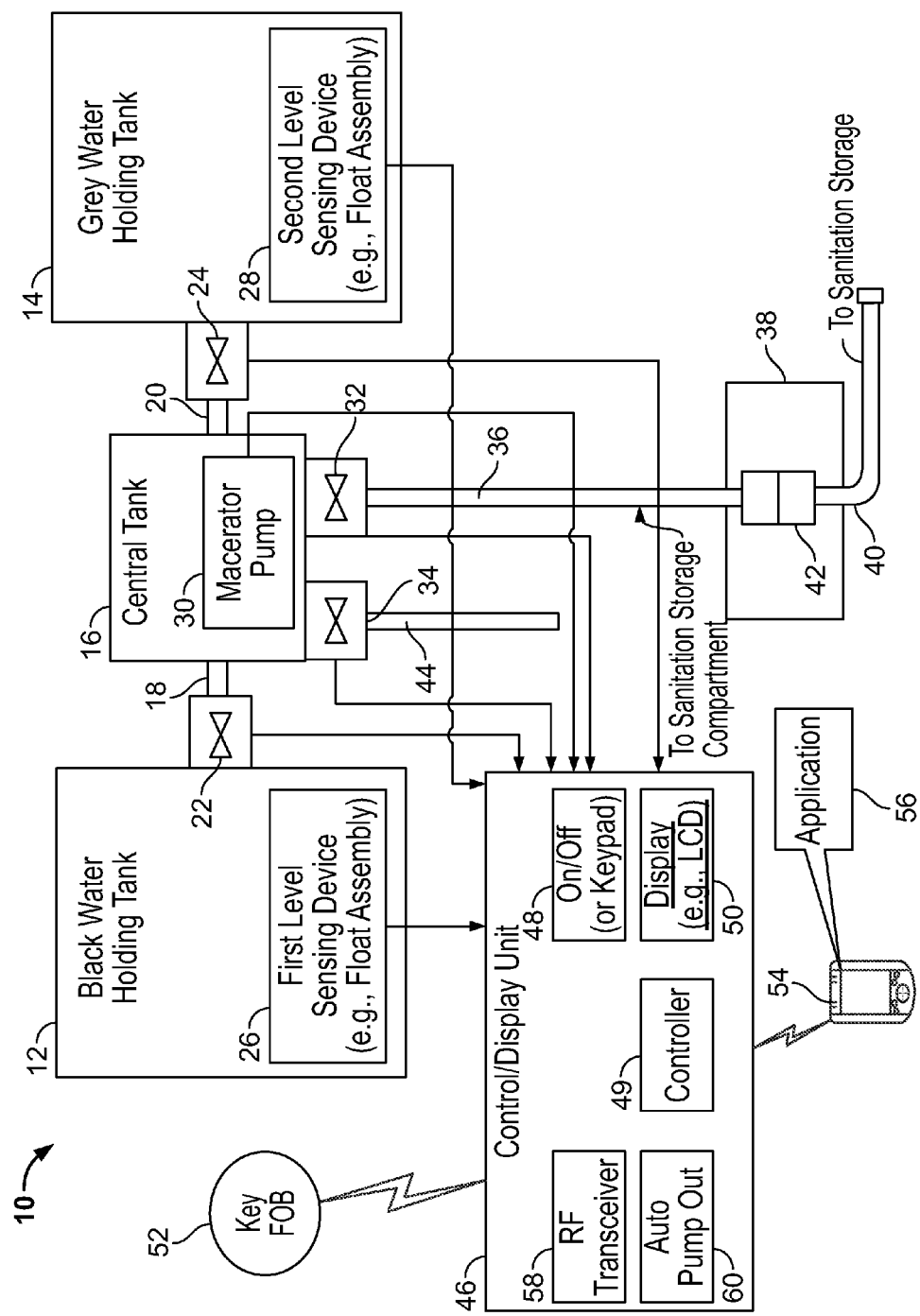
FIG. 1 is a high level block diagram of a waste fluid holding and drain system in accordance with one embodiment of the present disclosure for enabling storage and rapid, convenient emptying of black water and grey water from associated black water and grey water holding tanks.

The following description is merely exemplary in nature and is not intended to limit the present disclosure, application, or uses. It should be understood that throughout the drawings, corresponding reference numerals indicate like or corresponding parts and features.

Referring to FIG. 1, there is shown one embodiment of a waste holding and drain system 10 (hereinafter simply "system 10") in accordance with the present disclosure. The system 10 is expected to find its principal application in connection with recreational vehicles ("RVs"), although the system 10 could be used in any other application where waste is collected into a temporary waste holding tank that needs to be periodically emptied. The system 10 in this embodiment may generally include a first holding structure formed by a black water holding tank 12, a second holding structure formed by a grey water holding tank 14, and a third holding structure formed by a central or common holding tank 16. The central tank 16 is in communication with both of the black water tank 12 and the grey water tank 14 via conduits 18 and 20, respectively. Conduits 18 and 20 may be rigid, non-flexible conduits or, more preferably, they may be short lengths of flexible hose that allow a degree of flexibility in positioning the tanks 12 and 14 within a recreational vehicle, relative to the central tank 16. Suitable valves, for example gate valves 22 and 24, may be positioned in communication with the conduits 18 and 20, respectively, to enable the control over emptying of the fluids from the tanks 12 and 14. The gate valves 22 and 24 in this embodiment may be electronically controlled gate valves, however, manually actuated gate valves could be used as well. Still further, the system 10 is not limited to use with only gate valves; essentially any form of valve that can be electronically or manually commanded to open and close may potentially be used with the system 10.

The black water tank 12 may incorporate a first level sensing device, for example a first float assembly 26, therein. The grey water tank 14 may likewise incorporate a second level sensing device, for example a second float assembly 28, therein. The float assemblies 26 and 28 may be configured to transmit electronic signals that indicate a level of the waste water being held in their respective holding tanks 12 or 14. While the two level sensing devices will be described in the following discussion as float assemblies 26 and 28, it will be appreciated that the system 10 is not so limited. Essentially any type of level sensing device (e.g., capacitive or otherwise) that is able to sense the level of the waste water in holding tanks 12 and 14 and provide electrical signals indicative of the sensed levels, may be used with the system 10.

In the embodiment shown in FIG. 1, the central tank 16 houses a macerator pump 30. The macerator pump 30 typically is powered by the RV's +12 Vdc battery, although it may be powered by an auxiliary battery. It is preferred, but not essential, that the conduits 18 and 20 be flexible hoses as this provides a degree of flexibility in handling (i.e., removal or installation) of the macerator pump 30 in the event service of the macerator pump is required. An input of the macerator pump 30 may be in communication with the interior of the central tank 16, thus making it able to draw in waste fluids from either of the holding tanks 12 or 14 depending on which gate valve 22 or 24 is opened.

The macerator pump 30 may also be a submersible pump, assuming that it is to be housed within the central tank 16. The central tank 16 provides a degree of added protection to the macerator pump 30. However, it will be appreciated that the macerator pump 30 could instead be installed in some convenient location on the RV, and therefore does not necessarily need not be installed in a dedicated tank or enclosure, such as central tank 16. In such an implementation the macerator pump 30 would not need to be submersible. If the macerator pump 30 is not installed in the central tank 16, then it will be appreciated that the conduits 18 and 20 may be coupled to the two inputs of a suitable "Y" coupling, and an input of the macerator pump 30 coupled to the output of the Y coupling, so that fluids from either of the holding tanks 12 or 14 may be controllably pumped out by the macerator pump 30. For the purpose of the following discussion it will be assumed that the central tank 16, with its internally housed macerator pump 30, is being employed in the system 10.

The output of the macerator pump 30 may be coupled through suitable openings (not shown) in the central tank 16 to an optional main discharge valve, such as an electronically actuated gate valve 32, and also a separate valve, such as a manually actuated gate valve 34. The use or non-use of the main discharge gate valve 32 may be dictated by the manufacturer of the RV. Whether or not the main discharge gate valve 32 is incorporated, a main discharge conduit 36 is included which is able to communicate with an output of the macerator pump 30 so that waste water from either of the black or grey water holding tanks 12 or 14 may be drained through the main discharge conduit 36. In one embodiment the main discharge conduit 36 may be a rigid conduit, for example made from PVC, which extends to and is terminated at a convenient location 38, such as a compartment, enclosure or box, which is easily accessible by a user from the exterior of the RV. A flexible, extendable hose 40 of suitable diameter, for example 1.5 inch ID, and suitable length (e.g., 10'-25') when stretched, may be coupled to the main discharge conduit 36 via a suitable fitting. Preferably fitting 42 is some form of fitting that can be quickly and easily coupled to a cooperative/mating fitting on the discharge conduit 36 so that the hose 40 can be quickly and easily coupled to, and uncoupled from, the discharge conduit 36 by the user without any external tools.

The manually actuated gate valve 34 shown in FIG. 1 may also be in communication with a shorter length of conduit 44 (either rigid or flexible) that extends to a conveniently accessible location on the exterior of the RV, for example location 38. In the event the macerator pump 30 becomes inoperable for any reason, the conduit 44 and its associated manually actuated gate valve 34 may be used to enable gravity draining of the holding tanks 12 and 14.

With further reference to FIG. 1, a control subsystem in the form of a control display/unit 46 may be incorporated for controlling emptying of the black and grey water holding tanks 12 and 14. The control/display unit 46 may be located in any convenient location on the RV, but preferably is located at, or close to, location 38, to enable the user to perform the needed hose connections and control operations from a single location outside the RV. The control/display unit 46 may include a controller 49 which is in communication with the macerator pump 30, with each of the electronically controlled gate valves 22, 24 and 32, and with both of the float assemblies 26 and 28. The control/display unit 46 may incorporate a user engageable On/Off switch 48, in communication with the controller 49, for substantially simultaneously opening/closing selected ones of the gate valves 22, 24 and 32 (provided one is included), as well as turning on and off the macerator pump 30 to accomplish emptying of the holding tanks 12 and 14. Alternatively, a user engageable keypad may be included in place of the On/Off switch 48 which has a dedicated On/Off button. Still further, the controller 49 may be in communication with a display, for example an LCD touchscreen display 50. The display 50 may have soft touch keys or controls to enable user selection of which holding tank 12 or 14 drain, as well as starting/stopping of the macerator pump 30 and opening/closing of the gate valve 32 (if one is included).

In other implementations remote actuation of the macerator pump 30 and opening/closing of the gate valves 22, 24 and 32 may be accomplished by either a key fob 52 or even a smartphone 54 running a suitable software application 56. In either event, the key fob 52 or the smartphone 54 may be in wireless communications with a suitable RF transceiver subsystem 58 in communication with the controller 49. The RF transceiver subsystem 58 may operate in accordance with a well-known short range, wireless communication protocol, for example the BLUETOOTH® wireless communications protocol, or any other suitable protocol. This enables the user to remotely control the system 10 from a short distance.

Figure 2:
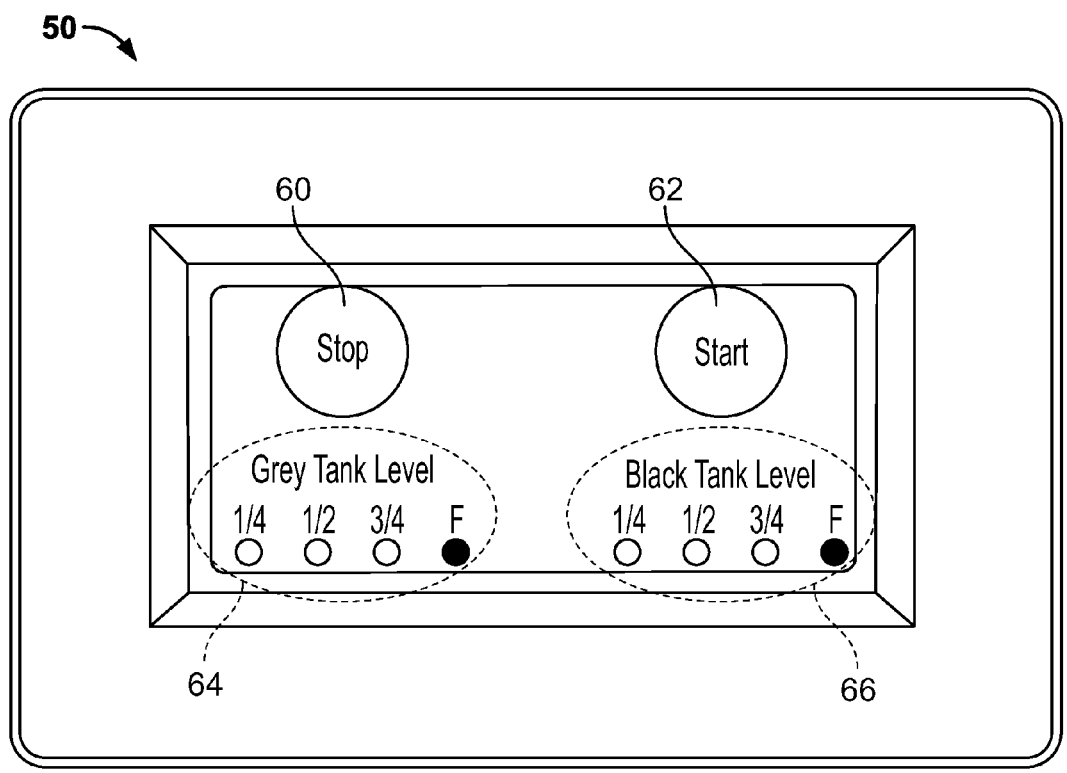
FIG. 2 is an illustration of one example of a control panel for controlling the system of FIG. 1.

With brief reference to FIG. 2, one example of the display 50 is shown. In this example separate "STOP" and "START" touch screen controls 60 and 62, respectively, are provided for starting and stopping the emptying of one or the other of the holding tanks 12 or 14. Also presented are tank level indicators 64 and 66 for informing the user of the level of waste water in each of the holding tanks 14 and 12, respectively. Separate controls (not shown) for selecting either the black water holding tank 12 or the grey water holding tank 14 may also be included. Those skilled in the art will appreciated that the display 50 represents only one of many possible ways that controls for controlling the system 10 may be laid out. The controls as shown in FIG. 2, or variations thereof, may also be implemented through suitable software on the application 56 running on the smartphone 54.

Figure 3:
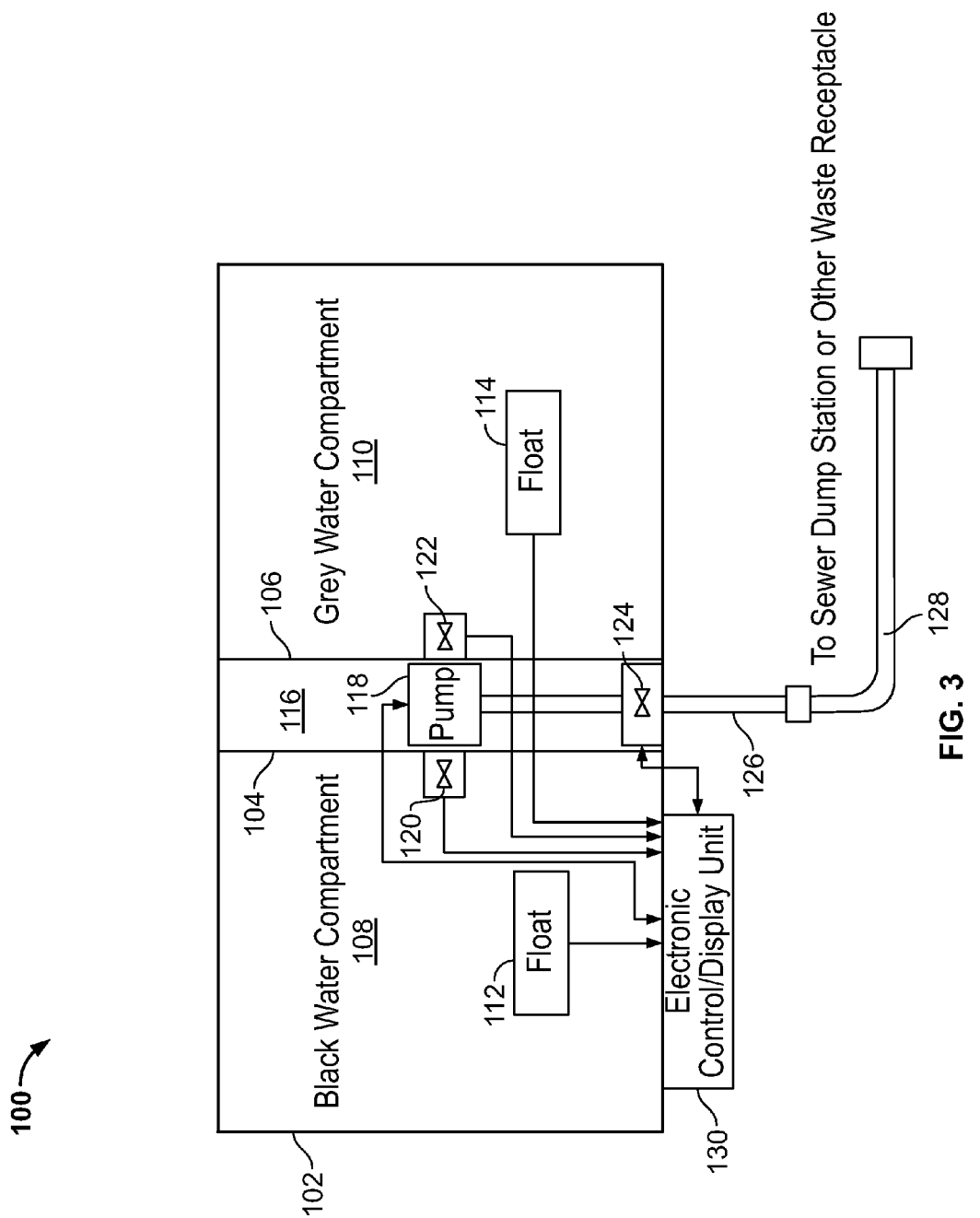
FIG. 3 is a high level block diagram of a system in accordance with another embodiment of the present disclosure which includes a single tank having internal partitions to contain the black water and grey water in separate compartments.

FIG. 3 illustrates a system 100 in accordance with another embodiment of the present disclosure. The system 100 primarily differs from the system 10 in that a single waste water holding tank 102 is used instead of the two fully independent holding tanks 12 and 14. The tank 102, however, is partitioned or otherwise formed to include suitable internal walls 104 and 106 or other like structure to effectively form two independent compartments 108 and 110 for separately holding black water and grey water. The two compartments 108 and 110 do not permit any mixing of the black water and the grey water. The black water tank compartment 108 may include a level sensing device, for example a float assembly 112, and the grey water tank compartment 110 may likewise include a level sensing device, for example its own float assembly 114. A small central compartment 116 may thus be formed within the holding tank 102 in which a macerator pump 118 may be housed. But like with the system 10, the macerator pump 118 may instead be housed outside the tank 102, and if this is the case, then possibly only a single internal wall would be needed within the tank, along with suitable outflow ports, to facilitate emptying of the tank compartments 108 and 110 into an input of the macerator pump 118.

The system 100 is also similar to the system 10 in that it makes use of suitable valves 120 and 122, for example electronically controlled gate valves, which may be electronically actuated to enable emptying of the contents of the tank compartments 108 and 110. The gate valves 120 and 122 may be in communication with an inlet of the macerator pump 118 such that the pump is able to pump out the contents of either waste compartment 108 or 110 depending on which of the valves 120 or 122 is opened. An optional discharge line valve, such as an electronically actuated gate valve 124, may also be included at the option of the RV manufacturer. Emptying of either holding compartment 108 or 110 is accomplished through a drain conduit 126. Drain conduit 126 may be either a rigid conduit, such as PVC conduit, or a flexible conduit. The drain conduit 126 may similarly be coupled to a flexible hose 128 which itself may be coupled to a sewer dump station or other waste water reservoir.

The macerator pump 120, the valves 120, 122 and 124 and the float assemblies 112 and 114 may each be in communication with an electronic control/display unit 130 to provide control over emptying of the tank compartments 108 and 110. The electronic control/display unit 130 may be similar or identical to the control/display unit 46 of the system 10, and is preferably located close to, or within a suitable compartment on the RV, where the flexible hose 128 is to be connected to the drain conduit 126. While a separate drain conduit with a manual override valve is not shown for the system 100, this feature could just as readily be included in the system 100 just as described for the system 10. The valves 120, 122 and 124, as well as the macerator pump 118, could also be controlled remotely such as with the key fob 52 or smartphone 54 as described for the system 10.

Figure 4:
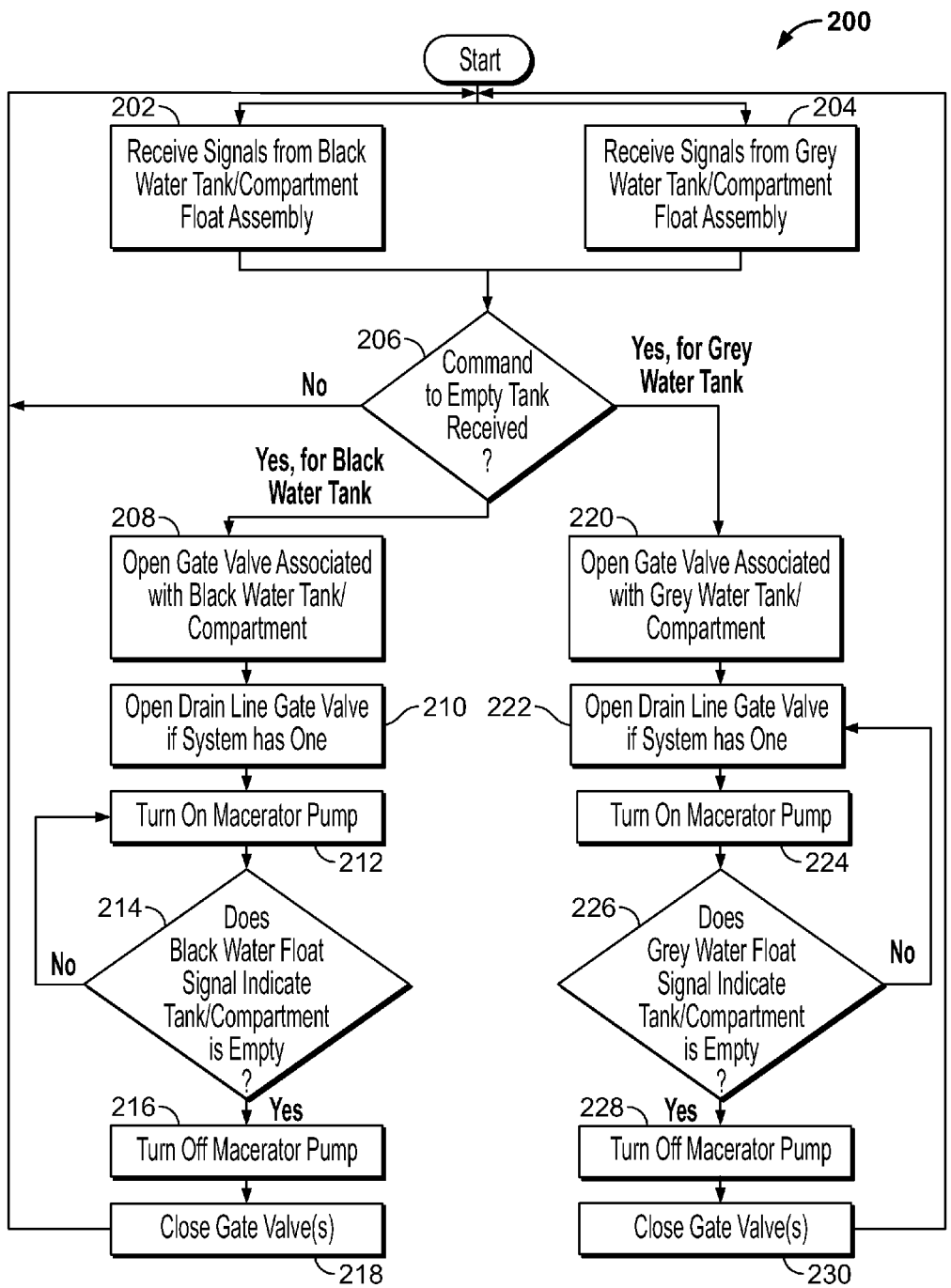
FIG. 4 is a flowchart of a sequence of operations that may be performed by a user to use the systems of FIG. 1 or 3 to empty stored black water and grey water.

Referring now to FIG. 4, a flowchart 200 shows one example as to how a sequence of operations may be performed in implementing either the system 10 or the system 100. The flowchart 200 assumes that the systems 10 or 100 have been configured as fully automatic systems where opening and closing of the various gate valves, as well as powering on and off of the macerator pump 30 or 118, is performed electronically and automatically. For the purpose of describing the operations shown in FIG. 4, reference will be made to the components of system 10. It will be understood that the described operations are equally applicable to the system 100.

At operations 202 and 204 the control/display unit 46 receives signals from the black water tank float assembly 26 and the grey water tank float assembly 28, respectively. A check is then made by the controller 49, at operation 206, to determine if a command has been received to empty either the black water holding tank 12 or the grey water holding tank 14. If no such command has been received, then operations 202 and 204 are repeated. Preferably operations 202 and 204 are performed relatively continuously while the system 10 is powered on, for example every few milliseconds so that the system 10 is essentially monitoring the control/display unit 46 in real time.

Assume now that the check at operation 206 indicates that the system 10 has received a command from the user, input via the control/display unit 46, to empty the black water holding tank 12. In this event an electrical signal will be sent to the black water tank gate valve 22 from the controller 49 of the control/display unit 46 to open the gate valve 22, as indicated at operation 208. The controller 49 will then send an electrical signal to the drain line gate valve 32 to open the gate valve 32, assuming that such a gate valve is included in the system 10, as indicated at operation 210. The controller 49 will then send an electrical signal to the macerator pump 30 to turn on the macerator pump, as indicated at operation 212. The macerator pump 30 will begin pumping the black water out from the black water holding tank 12. While this operation is taking place the control/display unit 46 will continue to monitor the signal received from the black water float assembly 26, as indicated at operation 214, to determine when the float assembly 26 indicates that the black water holding tank 12 is empty (or at least reaches a predetermined minimum level). This check is made repeatedly, for example every few milliseconds. As long as the black water float assembly 26 is indicating that the black water holding tank 12 is not empty, the macerator pump 30 is maintained in its powered on state.

When the check at operation 214 indicates that a signal has been received from the black water float assembly 26 that the black water holding tank 12 is empty (or at least at a predetermined minimum level), then the controller 49 sends an electrical signal turning off the macerator pump 30, as indicated at operation 216. At operation 218 electrical signals are sent to the gate valves 22 and 32 to close these gate valves. The control/display unit 46 then continues to perform operations 202-206 to detect for the input of another command from the user.

If the check at operation 206 indicates that the user has input a command to empty the grey water holding tank 14, then operations 220-230 are performed to empty the grey water holding tank. Operations 220-230 are the same as operations 208-218, respectively, and only differ by focusing on control of the macerator pump 30 based on operation of the grey water float assembly 28 and control of the gate valves 24 and 32.

An additional "automatic pump out" mode may also be included for users who use their RV essentially year around or for long stretches of time. The automatic pump out mode may be implemented via a suitable control option (soft or hard key or button, such as key 60 in FIG. 1) on the control/display unit 46. Entering the automatic pump out mode causes the control/display unit 46 or 130 to continuously monitor the float assemblies 26/28 of the system 10 or float assemblies 112/114 of the system 100. When a signal is received by any float assembly 26, 28, 112, 114 indicating that its associated holding tank (or holding compartment) is full, the control/display unit 46 or 130 may automatically open the appropriate gate valves and turn on the macerator pump 30 or 118 to empty the indicated holding tank, all without any input by the user. For such a feature, it may be desirable to include some suitable sensor by which the control/display unit 46 or 130 first checks to make sure a discharge hose (such as hose 40) is physically coupled to the drain conduit 36 or 126 before beginning the tank/compartment pump out operation.

The systems 10 and 100 thus provide a highly convenient and easy to use means for enabling a user to monitor the black water and grey water levels in the holding tanks of a waste water containment system, and to conveniently empty the tanks when needed. In particular, the systems 10 and 100 eliminate the need for the user to independently and manually hook up drain hoses to each of the black water and grey water holding tanks, one after the other, while emptying the tanks. With the systems 10 and 100, the user may hook up a single drain hose (e.g., hose 40 in FIG. 1), and then sequentially empty the black and grey water holding tanks by conveniently accessing the control/display unit 46. If the key fob 52 or smartphone application 56 is included, then the user may even remotely start the emptying operation from the remote location where the end of the drain hose 40 has been coupled to a remote sanitation/sewer hookup. In this manner the user would not even need to walk back and forth to the RV to command the emptying of both of the holding tanks on the RV.

While the systems 10 and 100 have been described in connection with use on an RV, it will be appreciated that the systems 10 and 100 could be used in virtually any other application where fluids need to be temporarily contained within a plurality of distinct holding tanks or holding compartments, and then periodically emptied by the user.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A waste fluid containment and draining system comprising:
   a waste water holding tank including:
      a black waste water holding compartment for holding black waste water;
      a grey waste water holding compartment for holding grey waste water;
      a central compartment having a first inlet, a second inlet, an outlet, a first partition wall separating the central compartment from the black waste water holding compartment, and a second partition wall separating the central compartment from the grey waste water holding compartment;
   a first electronically controlled valve for coupling a drain outlet of the black waste water holding compartment to the first inlet of the central compartment;
   a second electronically controlled valve at a partition for coupling a drain outlet of the grey waste water holding compartment to the second inlet of the central compartment;
   the first electronically controlled valve associated with the black waste water holding compartment enabling emptying of the black waste water when a signal is received by the first electronically controlled valve causing the first electronically controlled valve to be opened;

the second electronically controlled valve associated with the grey waste water holding compartment enabling emptying of the grey waste water when a signal to the second electronically controlled valve is received causing the second electronically controlled valve to be opened;

a macerator pump having an input in flow communication with an interior area of the central compartment;

a third electronically controlled valve operably associated with the central compartment and in communication with the macerator pump;

a discharge conduit in flow communication with an output of the macerator pump and with the third electronically controlled valve; and a control subsystem in communication with the first, second and third electronically controlled valves and the macerator pump for selectively controlling opening of the first, second and third electronically controlled valves, together with the macerator pump, to enable operation of the macerator pump and selective pumping out of the black waste water and grey waste water holding compartments through the central compartment, through the third electronically controlled valve, and through the discharge conduit.

2. The system of claim 1, further comprising a first level sensing device for sensing a level of the black waste water contained within the black waste water holding compartment.

3. The system of claim 1, further comprising a second level sensing device for sensing a level of the grey waste water contained within the grey waste water holding compartment.

4. The system of claim 1, further comprising:

a first float assembly for sensing a level of the black waste water contained within the black waste water holding compartment and providing an electrical signal indicative thereof to the control subsystem; and a second float assembly for sensing a level of the grey waste water contained within the grey waste water holding compartment and providing an electrical signal indicative thereof to the control subsystem.

5. The system of claim 1, wherein the control system includes a control for enabling a user to initiate draining of a selected one of the black waste water or grey waste water holding compartments.

6. The system of claim 5, wherein the control comprises at least one of:

a user engageable On/Off switch;

a user engageable keypad; and a touchscreen display having soft key controls.

7. The system of claim 1, wherein at least one of the first, second and third electronically controlled valves comprises an electronically controlled gate valve.

8. The system of claim 1, further comprising:

the macerator pump being disposed in the central compartment.

9. The system of claim 1, wherein the black waste water holding compartment, the central compartment and the grey waste water holding compartment are formed in the waste water holding tank by a plurality of partitions.

10. The system of claim 9, wherein the macerator pump is located within the central compartment.

11. The system of claim 1, wherein the control system is configured to implement an automatic emptying mode where emptying of either of the black waste water holding compartment or the grey waste water holding compartment may be automatically initiated by the system without a command from a user.

12. The system of claim 11, wherein the macerator pump is housed in the central waste water holding structure.

13. The system of claim 11, wherein the control subsystem includes at least one of:

an On/Off key engageable by the user for initiating emptying of one or both of the black waste water holding structure and the grey waste water holding structure into the central waste water holding structure;

a keypad engageable by the user for initiating emptying of one or both of the black waste water holding structure and the grey waste water holding structure into the central waste water holding structure; and a touchscreen display having soft key controls for enabling the user to initiate emptying of one or both of the black waste water holding structure and the grey waste water holding structure into the central waste water holding structure.

14. The system of claim 1, further comprising a device for remote actuation of the macerator pump, the additional valve and the plurality of valves, the device being selected from a group consisting of a key fob and a smartphone.

15. A waste fluid containment and draining system comprising:

a black waste water holding structure for holding black waste water;

a grey waste water holding structure for holding grey waste water;

a central waste water holding structure disposed adjacent the black and grey waste water holding structures, the central waste water holding structure including a first partition wall separating the black waste water holding structure from the central waste water holding structure, and a second partition wall separating the central waste water holding structure from the grey waste water holding structure;

a first liquid level sensing device configured to sense a level of black waste water contained in the black waste water holding structure, and generating a first electrical signal indicative of the sensed level of the black waste water;

a second liquid level sensing device configured to sense a level of grey waste water contained in the grey waste water holding structure, and generating a second electrical signal indicative of the sensed level of the grey waste water;

a first electronically actuated valve associated with the black waste water holding structure which enables emptying of the black waste water into the central waste water holding structure when the first valve is opened;

a second electronically actuated valve associated with the grey waste water holding structure which enables emptying of the grey waste water into the central waste water holding structure when the second valve is opened;

a third electronically actuated valve operably associated with an interior area of the central waste water holding structure;

a macerator pump in flow communication with the third electronically actuated valve and having an input in flow communication with an interior area of the central waste water holding structure;

a discharge conduit in flow communication with an output of the macerator pump; and a control subsystem in communication with the first and second electronically actuated valves, the first and second level sensing devices, and the macerator pump, the control system configured to control the first and second electronically actuated valves, together with the macerator pump, to enable selective operation of the macerator pump and pumping out of the black waste water and grey waste water holding structures through the central waste water holding structure and through the discharge conduit.

16. A method for containing and emptying waste fluids collected from one or more toilets on a vehicle, the method comprising:

using a black waste water holding structure to hold black waste water;

using a grey waste water holding structure to hold grey waste water;

using a central waste water holding structure including a first partition wall between the central waste water holding structure and the black waste water holding structure, and a second partition wall between the central waste water holding structure and the grey waste water holding structure, the central waste water holding structure operating to receive and hold both black waste water and grey waste water;

using a plurality of valves associated with the black and grey waste water holding structures to enable selective emptying of one or both of the black and grey waste water holding structures into the central waste water holding structure when the valves are opened;

using an additional valve in flow communication with the central waste holding structure to control emptying of the central waste holding structure;

using a macerator pump having in flow communication with an interior of the central waste water holding structure and with the additional valve, to pump out the black waste water and the grey waste water from the central waste water holding structure;

using a discharge conduit in flow communication with an output of the macerator pump to drain at least one of the black waste water and the grey waste water from the central waste water holding structure to a remote waste water receiving facility; and using a control subsystem in communication with the plurality of valves, the additional valve, and the macerator pump for controlling the plurality of valves and the additional valve, together with the macerator pump, to enable operation of the macerator pump and selective draining of the holding structures through the central waste water holding structure, the additional valve, and the discharge conduit.

17. The method of claim 16, wherein using a control subsystem includes remotely controlling the control subsystem with a device selected from a group consisting of a key fob and a smartphone.

18. A waste fluid containment and draining system comprising:

a black waste water holding compartment for holding black waste water;

a grey waste water holding compartment for holding grey waste water;

a central compartment having a first inlet, a second inlet, and an outlet;

a first electronically controlled valve for coupling a drain outlet of the black waste water holding compartment to the first inlet of the central compartment;

a second electronically controlled valve at a partition for coupling a drain outlet of the grey waste water holding compartment to the second inlet of the central compartment;

the first electronically controlled valve associated with the black waste water holding compartment enabling emptying of the black waste water when a signal is received by the first electronically controlled valve causing the first electronically controlled valve to be opened;

the second electronically controlled valve associated with the grey waste water holding compartment enabling emptying of the grey waste water when a signal to the second electronically controlled valve is received causing the second electronically controlled valve to be opened;

a macerator pump having an input in flow communication with an interior area of the central compartment;

a third electronically controlled valve operably associated with the central compartment and in communication with the macerator pump;

a discharge conduit in flow communication with an output of the macerator pump and with the third electronically controlled valve; and a control subsystem in communication with the first, second and third electronically controlled valves and the macerator pump for selectively controlling opening of the first, second and third electronically controlled valves, together with the macerator pump, to enable operation of the macerator pump and selective pumping out of the black waste water and grey waste water holding compartments through the central compartment, through the third electronically controlled valve, and through the discharge conduit.

* * * * *